(12) United States Patent
Solberg (10) Patent No.: US 6,854,756 B1
(45) Date of Patent: *Feb. 15, 2005

(54) TOW BAR ASSEMBLY

(76) Inventor: Glenn S. Solberg, HC1, Box 41, 13592 77th St., NW., Williams County, ND (US) 58856

( * ) Notice: Subject to any disclaimer, the term of this patent is extended or adjusted under 35 U.S.C. 154(b) by 0 days.

This patent is subject to a terminal disclaimer.

(21) Appl. No.: 10/091,131

(22) Filed: Mar. 5, 2002

Related U.S. Application Data (63) Continuation-in-part of application No. 08/904,705, filed on Aug. 1, 1997, now Pat. No. 6,352,278, which is a continuation-in-part of application No. 08/421,405, filed on Apr. 13, 1995, now abandoned, which is a continuation-in-part of application No. 08/110,241, filed on Aug. 23, 1993, now abandoned, which is a continuation-in-part of application No. 07/867,984, filed on Apr. 13, 1992, now abandoned.

(51) Int. Cl.$^7$ .............................................. B60D 1/167
(52) U.S. Cl. .................. 280/482; 280/491.5; 403/322.4
(58) Field of Search ................................ 280/493, 482, 280/491.1, 491.2, 491.4, 492, 494, 491.5; 403/322.4, 324; 292/139, 240, 241

(56) References Cited

U.S. PATENT DOCUMENTS

| | | | | |
|---|---|---|---|---|
| 593,373 A | | 11/1897 | Estell ......................... 403/107 |
| 943,052 A | * | 12/1909 | Tunis ......................... 403/322.4 |
| 1,327,338 A | | 1/1920 | Levinson et al. ........ 280/415.1 |
| 2,349,301 A | | 5/1944 | Overby ......................... 292/2 |
| 2,417,646 A | * | 3/1947 | Hallner .................... 280/478.1 |
| 2,425,838 A | * | 8/1947 | Schultz ....................... 280/482 |
| 2,481,685 A | | 9/1949 | Rogers .................... 280/491.5 |
| 2,484,751 A | | 10/1949 | Schultz .................... 280/491.2 |
| 2,639,160 A | | 5/1953 | Studebaker et al. ........ 280/495 |
| 2,650,317 A | | 8/1953 | Maclay et al. .............. 310/258 |
| 2,667,366 A | | 1/1954 | Otjen ......................... 280/482 |
| 2,693,368 A | * | 11/1954 | Petron ......................... 280/482 |
| 2,914,343 A | | 11/1959 | Roth ......................... 280/491.2 |
| 3,129,019 A | | 4/1964 | Bartone ...................... 280/485 |
| 3,154,325 A | * | 10/1964 | Thompson et al. ...... 280/478.1 |
| 3,158,387 A | | 11/1964 | Martin .................... 280/478.1 |
| 3,235,296 A | | 2/1966 | Day ........................... 403/112 |
| 3,437,355 A | * | 4/1969 | Jeffes ..................... 280/479.3 |
| 3,446,518 A | * | 5/1969 | Dodgson .................... 280/482 |
| 3,492,022 A | | 1/1970 | Hanson .................. 280/478.1 |
| 3,806,162 A | | 4/1974 | Milner ....................... 280/502 |
| 3,984,121 A | | 10/1976 | Dobosi .................... 280/414.1 |
| 4,861,061 A | * | 8/1989 | Frantz ...................... 480/479.2 |
| 4,870,810 A | | 10/1989 | Gordy ............................ 56/6 |
| 4,978,134 A | | 12/1990 | Dahl et al. ............... 280/491.4 |
| 5,011,176 A | | 4/1991 | Eppinette ................. 280/479.3 |
| 5,071,153 A | * | 12/1991 | Duncan .................... 280/491.4 |
| 5,147,095 A | | 9/1992 | Duncan .................... 280/491.4 |
| 5,356,166 A | * | 10/1994 | Hahne et al. ............. 280/491.4 |
| 5,915,715 A | * | 6/1999 | Ford ........................... 280/494 |
| 5,957,477 A | * | 9/1999 | Ensz et al. ................... 280/482 |
| 6,352,278 B1 | * | 3/2002 | Solberg ...................... 280/482 |

* cited by examiner

*Primary Examiner*—Anne Marie Boehler
(74) *Attorney, Agent, or Firm*—Webb Ziesenheim Logsdon Orkin & Hanson, P.C.

(57) ABSTRACT

A tow bar assembly includes first and second telescopic members. A releasable locking arrangement holds the first and second telescopic members in an extended position and includes at least one movable member to maintain the telescopic members in the locked relationship and a pivotally mounted release member mounted on one of the telescopic members to move the movable member to permit slidable movement between the first and second telescopic members. The invention provides coupling of interacting members one slidable in the other. The members define an opening for an extended and circular counterpart. The counterpart penetrates the opening and the members are held in position. The members together exert forces on the counterpart and a release device between the counterpart and the members release the members.

17 Claims, 6 Drawing Sheets

TOW BAR ASSEMBLY

CROSS REFERENCE TO RELATED APPLICATIONS

This application is a continuation-in-part of U.S. patent application Ser. No. 08/904,705, filed Aug. 1, 1997 (now U.S. Pat. No. 6,352,278), which is a continuation-in-part of U.S. patent application Ser. No. 08/421,405, filed Apr. 13, 1995 now abandoned and entitled "Extensible Connector With Lock Mechanism", which is a continuation-in-part of U.S. patent application Ser. No. 08/110,241, filed. Aug. 23, 1993 now abandoned and entitled "Pressure Release Systems", which is a continuation-in-part of U.S. patent application Ser. No. 07/867,984, filed Apr. 13, 1992 now abandoned and entitled "Pressure Release Systems", now abandoned, all of which patent and patent applications are herein incorporated by reference in their entirety. This application is also related to U.S. Pat. No. 5,713,691, which is also herein incorporated by reference in its entirety.

BACKGROUND OF THE INVENTION

1. Field of the Invention

This invention relates generally to vehicle tow bars and, more particularly, to foldable and collapsible tow bars which are easily attached and removed from the towed and towing vehicles.

2. Description of the Currently Available Technology

Conventional tow bars are typically either single bars or are of an A-frame type that are rigidly mounted to the towed and towing vehicles. Alternatively, collapsible tow bars are known which are arranged to be folded for storage purposes when not in use. Also, known tow bars include telescopically adjustable members which are secured by locking members adapted for remote actuation.

U.S. Pat. Nos. 4,978,134; 5,071,153; and 5,147,095 teach the mounting of collapsible, telescoping tow bar members.

U.S. Pat. Nos. 5,011,176; 3,984,121; 4,861,061; 2,484,751; 3,492,022; 2,639,160; and 3,158,387 disclose pressure release and/or extension and retraction locking capabilities for telescoping tow bar members. U.S. Pat. No. 3,984,121 discloses a spring-biased pivotal mechanism for a locking pin which is adaptable for insertion into complementary openings to adjust and secure telescoping tow bar members. U.S. Pat. No. 2,639,160 discloses an eccentric roller/cylinder member, an eccentric lobe portion of which engages complementary notches when rotated to lock telescoping bar members in place. U.S. Pat. No. 3,158,387 discloses cam locking means to secure tow bar telescoping members.

U.S. Pat. No. 2,914,343 discloses a tow bar mounting attached to a vehicle frame under the bumper and telescoped such that it can be retracted to conceal the mount.

U.S. Pat. No. 3,806,162 discloses a clamp attachment to a bumper for a universal tow bar mounting.

U.S. Pat. No. 2,667,366 discloses a remote pin release mechanism to permit actuation for locking and unlocking adjustable telescoping tow bar members.

While the tow bars described in the above-referenced patents provide some advantages, they do not permit the overall versatility of the present invention. For example, in the prior art structures, there can be considerable difficulty in releasing the locking mechanism for the tow bar members especially when the towed and towing vehicles are stopped at a position where there is a tension force on the tow bar members. In such a situation, it may be necessary to dismount the towing vehicle to manually force disengagement of the locking mechanism by utilizing a hammer or the like.

SUMMARY OF THE INVENTION

The invention is directed to an easily attachable and detachable tow bar assembly that avoids at least some of the problems of the prior art.

In one embodiment, the invention includes a collapsible and universal mount for the tow bar for ease of storage when not in use. The invention can include one or more adjustable telescoping frame members, e.g., tubular frame members, for attachment and detachment to towed and towing vehicles regardless of their static position relative to each other.

Each adjustable telescoping tubular frame member can include a pair of telescopic members and an easily actuated release mechanism for securing the telescopic members to each other so that they can be easily released, either remotely or otherwise, despite the fact that the towed and towing vehicles may cause considerable tension forces on the bars. For example, the vehicles may be parked on a hill when it is desired to unhook the tow bar assembly. In this case, it is clear that any release mechanism will be under considerable tension forces making it difficult to affect release without the use of a force applying implement or the like.

One embodiment of the invention includes a pivot pin locking device which includes a high leverage release mechanism, e.g., providing a mechanical advantage having a ratio on the order of 10:1 or greater.

DESCRIPTION OF PREFERRED EMBODIMENTS

As used herein, spatial or directional terms, such as "inner", "outer", "above", "below", "top", "bottom", and the like, relate to the invention as it is shown in the drawing figures. However, it is to be understood that the invention may assume various alternative orientations and, accordingly, such terms are not to be considered as limiting. Further, all numbers expressing dimensions, physical characteristics, and the like, used in the specification and claims are to be understood as being modified in all instances by the term "about". Accordingly, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10.

Figure 1:
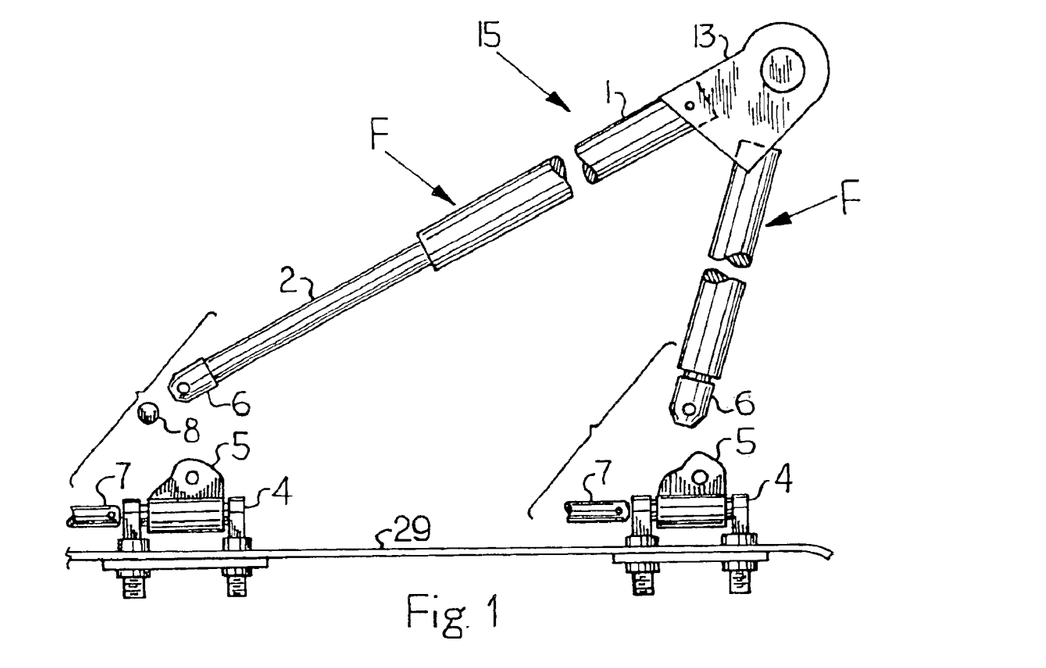
FIG. 1 is a plan view of a tow bar assembly of the invention having telescopically adjustable frame members.

Referring to the drawings in detail, FIG. 1 discloses a tow bar assembly 15 having at least one, e.g., a pair, of frame members F connected to an apex member 13 which can be operatively connected to a towing vehicle (not shown). The other end of each frame member F has a pivot member 6 attached thereto which can be operatively connected to a towed or trailing vehicle (not shown). The tow bar assembly 15 can include one or more, e.g., two, movable (e.g., telescoping) tubular frame members F. One of the tubular frame members F can be pivotally connected to the apex member 13 for movement in a substantially horizontal plane. The other tubular frame member F can also be fixed to the apex member 13.

The trailing (distal) end of each frame member F can be connected to the bumper 29 of the towed vehicle and, with the elements to be described, form universal connections between the frame members F and the vehicle bumper 29. Each universal connection can include spaced-apart eye bolt members 4 fastened to the bumper 29 by nuts or the like with the eyes of the eye bolts being disposed on a substantially horizontal axis in FIG. 1. Interposed between the eye bolts is a connecting member 5 having both horizontally and vertically disposed apertures as depicted in FIG. 1. The horizontally disposed aperture is interposed between the eye bolts and is journaled therebetween by a journal pin 7. This permits pivotal movement of the connecting member 5. The vertically disposed aperture of member 5 can be connected to the pivot member 6 of a frame member in any conventional manner, e.g., by a bolt or similar connecting device. A vertically disposed journal pin 8 can extend through the vertical apertures in members 5 and 6 and can be secured by any suitable means. The above-described connection between the members 5 and 6 permits pivotal movement of the pivot member 6 in a horizontal plane. The above-described connection between members 4, 5, and 6 permits a universal connection between each frame member F and the vehicle bumper 29 so that the tow bar assembly 15 is free to move in both horizontal and vertical planes with respect to the bumper 29.

While only one frame member F has been described as attached to the vehicle bumper 29, it is readily apparent that the other frame member F of the tow bar assembly 15 can be attached to the bumper 29 in a laterally spaced relationship with like connecting means.

The universal connection between each frame member and the vehicle bumper permits multiple types of relative motion between the frame members and bumper thus reducing the strain or stress either to the bumper or the respective frame members especially when towing over uneven or bumpy terrain.

The universal connections between the frame members and the bumper also permit easy mounting, dismounting, and collapsible storage for the tow bar assembly 15. Frame members F can be easily disconnected from eye bolts 4 by removing journal pins 7. Thereafter, frame members F can be folded together by virtue of their pivotal connection to apex member 13, and stowed in a convenient location. Alternatively, only one frame member need be disconnected and swung together in adjacent relationship with the other frame member, and both frame members may be swung in parallel relationship with the vehicle bumper by virtue of the vertically disposed pin 8 to a storage position. Additionally, both frame members may be swung on journal pins 7 in a vertical plane to an upright position against the vehicle for storage.

Each frame member F can include an outer or first, e.g., tubular, telescopic member 1 and an inner or second, e.g., tubular, telescopic member 2 which permit axial adjustment of the frame members for ease of connection between the towing and towed vehicles. Each frame member F can have a locking device, e.g., a high leverage locking and release mechanism, for locking the telescopic members 1 and 2 in various adjusted positions and for providing easily releasable means for unlocking the telescopic elements under a variety of conditions.

Figures 1A, 3:
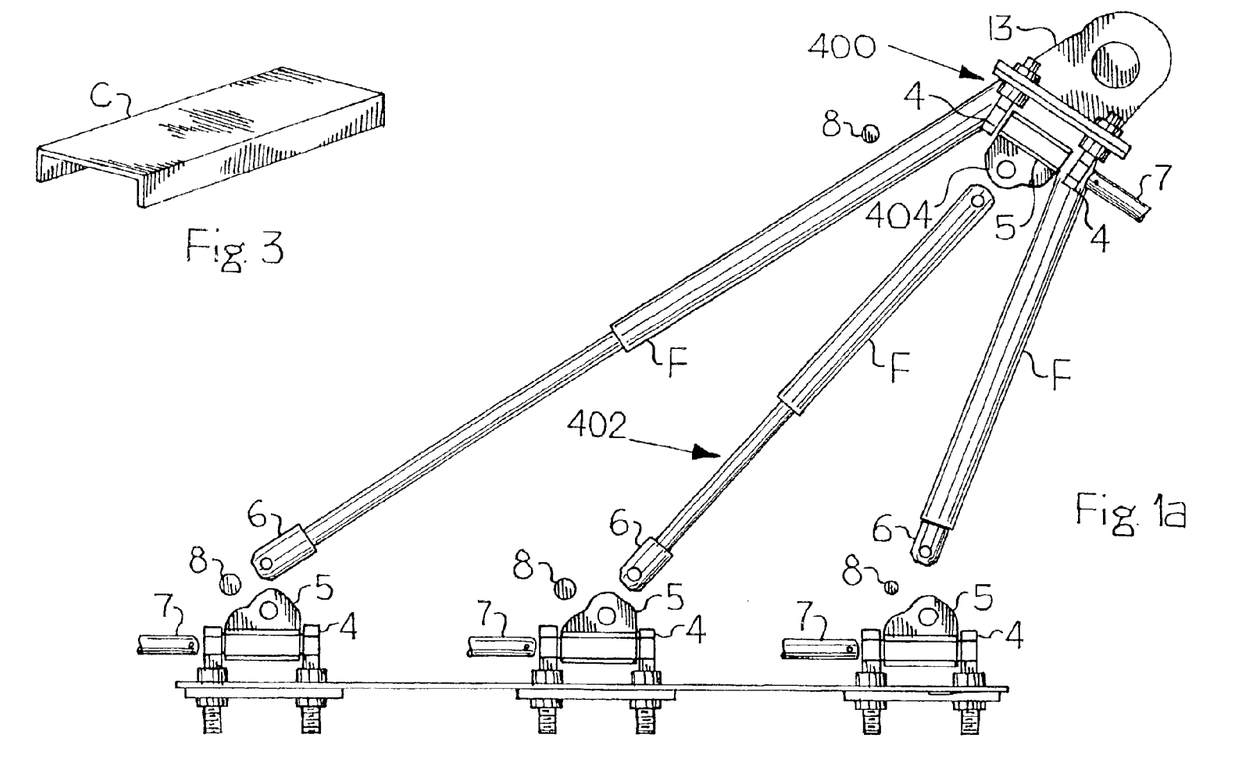
FIG. 1A is an alternative embodiment of the tow bar assembly shown in FIG. 1 having three telescopically adjustable frame members.
FIG. 3 is a protective cover for the locking arrangement of FIG. 2.

FIG. 1A shows an alternative embodiment of the tow bar assembly 15 shown in FIG. 1. In the embodiment shown in FIG. 1A, an additional universal connection is located on the vehicle. A similar universal connection 400 is mounted on the apex member 13 and a third center telescoping frame member 402 is connectable between the vehicle and the universal connection 400. The connecting member 5 of the universal connection 400 can include a hollow extension member 404. The embodiment shown in FIG. 1A is particularly well suited for towing a farm implement. The center universal connection on the vehicle can be positioned higher than the outer two universal connections to hold the tow bar up in a locked position when all three telescoping frame members F are extended. The extension member 404 of the universal connection 400 can be substantially perpendicular to the associated connecting member 5, through which an associated pin 8 passes allowing horizontal movement of the telescoping frame member 402. Vertical movement is permitted via the associated journal pin 7.

Where the middle telescoping member of FIG. 1A is mounted to a towed unit with eyebolts completing a universal joint, the third (center) tow bar arm can be above the others resulting in no up and down movement when extended and locked, or it can be the same (horizontal) height as the others so it can move up and down when extended and locked, resulting in at least a 33% heavier rated tow bar.

If all three universal joints were on the same level, the inner tube would mount to the tongue at the same level also. Only one of the three telescoping members could fasten solid to the tongue, or all of the three members could swivel at the tongue. There could be any number of telescopic members fastened to the tongue. Either end of the telescopic members could be fastened to the universal connector, and either end of the telescopic members could be fastened to the tongue.

Figure 2:
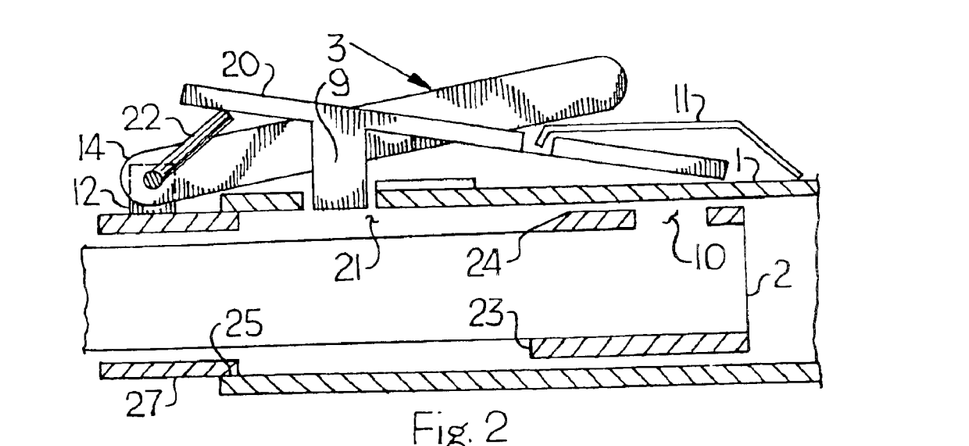
FIG. 2 is a partial vertical section of a first embodiment of a release pin locking arrangement of the invention.

FIG. 2 illustrates a first embodiment of a high leverage locking and release mechanism 3 which can be adapted to selectively lock the first or outer telescopic member 1 with respect to a second or inner telescopic member 2. The tow bar can have a single frame member adapted to extend between the towed and towing vehicles or can have two or more frame members, such as the tow bar assembly shown in FIG. 1. In FIG. 2, the first telescopic member 1 can be adapted to be connected to a towing vehicle. The second telescopic member 2 is telescoped within first telescopic member 1 and can be adapted at its outer end to be connected to a towed vehicle. Telescopic members 1 and 2 can be of any convenient length to permit relative adjustment to facilitate attachment to the towed and towing vehicles regardless of their relative spacing. For example, the first telescopic member 1 can be a square, tubular metal member, e.g., steel, having sides in the range of 1 inch to 2 inches wide, e.g., 1½ inches to 1¼ inches wide. The second telescopic member 2 can also be a square, tubular metal member dimensioned to be slidable within the first telescopic member 1.

With further reference to FIG. 2 of the drawings, first telescopic member 1 carries a high leverage locking and release mechanism 3 which includes a movable member, such as a latch pin 9, depending from a latch plate 20. One end of the latch plate 20 is pivotally mounted to the first telescopic member 1 at a distance from the pin 9 and is biased downwardly toward the first telescopic member 1 by a leaf spring 11. At least one aperture 21 is located in the upper portion of the first telescopic member 1 through which the depending pin 9 can extend. The second telescopic member 2 is provided with at least one aperture 10 which, when in registry with an aperture 21, locks the telescopic members 1 and 2 relative to each other by virtue of the depending pin 9 on the latch plate 20 passing through both apertures 21 and 10 under the bias of the spring 11.

The locking and release mechanism 3 includes an actuator for releasing pin 9 from inner aperture 10 to permit telescopic adjustment of telescopic members 1 and 2. The actuator includes an elongated lever 14 which can be pivotally mounted on first telescopic member 1 relatively near depending pin 9. Lever 14 may also be pivotally mounted between hinge plates 12 on an extension member 27 carried on first telescopic member 1. Lever 14 includes an upwardly extending projection 22 which is adapted to engage the underside of latch plate 20 near the free end of the latch plate. As can be readily understood from FIG. 2, when the free end of lever 14 is pivoted upwardly away from first telescopic member 1, the free end of projection 22 engages the underside of the latch plate 20 to raise the depending pin 9. By virtue of the relative spacing of latch plate 20, the lever pivot points and projection 22 engaging latch plate 20 near its free end, it is apparent that a high leverage moment causes a mechanical advantage, e.g., with a ratio in the neighborhood of 10:1 or greater. In one embodiment, the locking and release mechanism 3 protrudes less than 2 inches above the outer telescopic member 1 in a tow position, e.g., less than 1 inch, e.g., ⅞ inch or less. The mechanism 3 can protrude less than 2 inches from the sides of the outer telescopic member 1, e.g., less than or equal to 1⅛ inches.

First and second telescopic members 1 and 2 can be of any tubular cross-sectional configuration, such as round, square, or rectangular. FIG. 3 illustrates a cover C which can be placed over mechanism 3 shown in FIG. 2 and attached to outer telescopic member 1, for example, by welding, to protect mechanism 3 and to push down on leaf spring 11 to assist biasing pin 9 into aperture 10.

Again referring to FIG. 2 of the drawings, second telescopic member 2 can be provided with a shoulder 23 that has an upper beveled or chamfered surface 24 near aperture 10. This enables pin 9 to smoothly ride up surface 24 to engage into aperture 10. The shoulder 23 also cooperates with an inner shoulder 25 carried on first telescopic member 1 to limit telescopic lengthening when the shoulders engage or abut.

In operation, the vehicles are positioned relative to one another and telescopic members 1 and 2 are adjusted to attach to the towed and towing vehicles, respectively. The towing vehicle is then driven forward whereupon first telescopic member 1 moves relative to second telescopic member 2 and pin 9 rides along and over beveled surface 24 into locking engagement with aperture 10.

As will be appreciated by those skilled in the art, it can be difficult to unhook a towing assembly from a vehicle upon conclusion of the tow. This is because the towing assembly frame members may be under considerable tension and/or force depending upon the terrain. Locking and release mechanism 3 alleviates this problem since it is only necessary to actuate lever 14 to provide for high leverage release of the pin 9 from aperture 10. This allows the frame members to rest in a non-tensioning position permitting the unhooking of the tow bar assembly 15 at either end.

Figure 4:
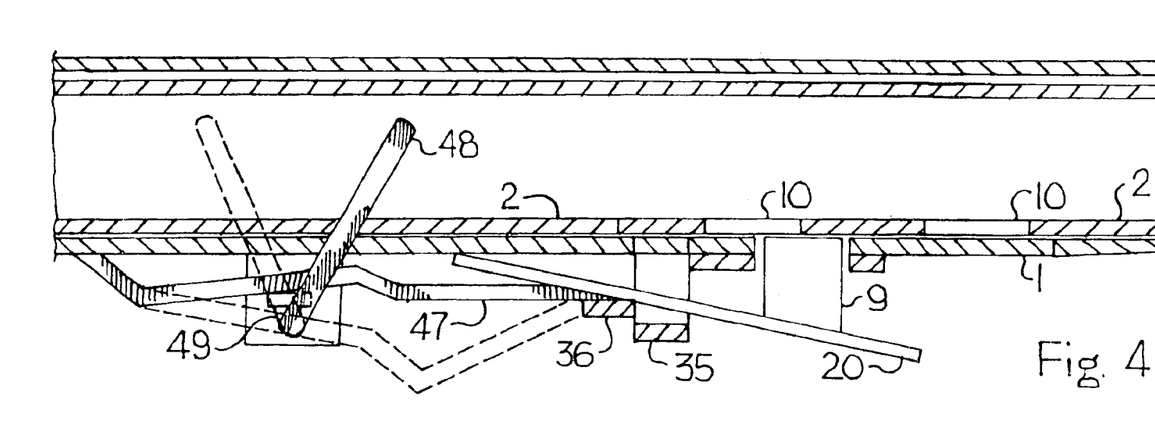
FIGS. 4 and 6 are partial vertical sections of another embodiment of a release pin locking arrangement.
Figure 5:
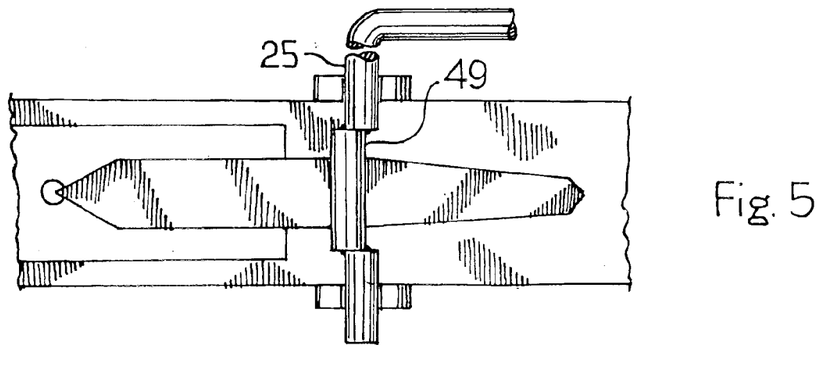
FIG. 5 is a bottom view of the pin release arrangement of FIG. 4.
Figure 6:
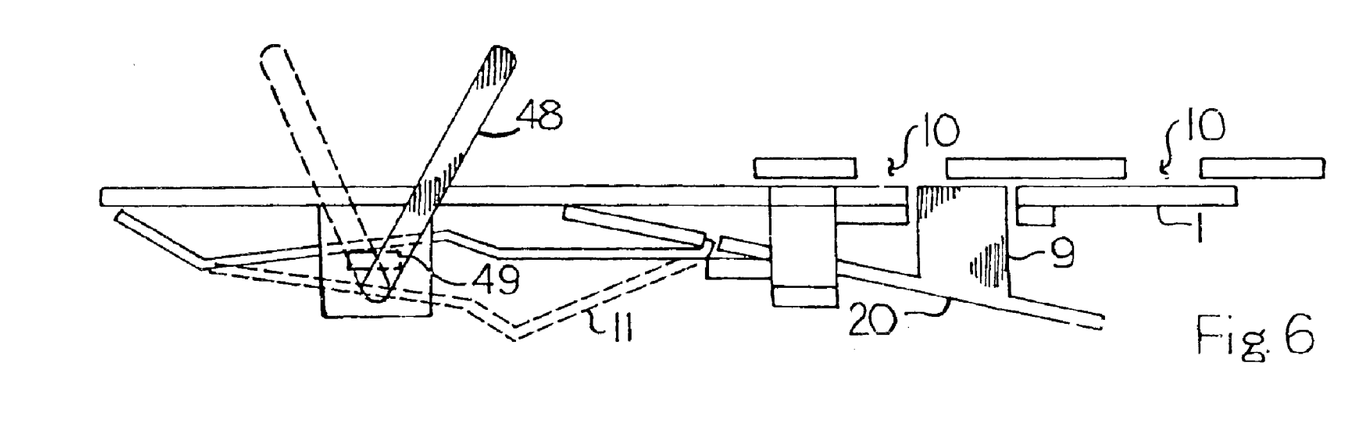

FIGS. 4, 5, and 6 illustrate a variation of the pin locking mechanism 3 shown in FIG. 2. FIG. 4 shows a latch plate 20 pivotally mounted on the telescopic member 2 with a pin 9 extending upwardly therefrom. A leaf spring bias means 47 is attached at one end to telescopic member 2 and the opposite end engages the latch plate 20 at its underside for maintaining pin 9 in an upward position toward apertures 10. A lever 48 is pivotally mounted on second telescopic member 2 and has a cam 49 engaging the underside of the bias means 47. When handle 48 is rotated to the left, shown as dotted lines in FIG. 4, the cam 49 provides a high leverage on latch plate 20 forcing pin 9 upwardly into an aperture 10. When the lever 48 is released, pin 9 drops out of aperture 10 by gravity. A depending U-shaped yoke member 35 is welded to the lower surface of telescopic member 2 and serves as a stop for the movement of latch plate 20. A horizontal member 36 extends from member 35 below the end of the bias means 47 to keep the spring end in place.

Figure 7:
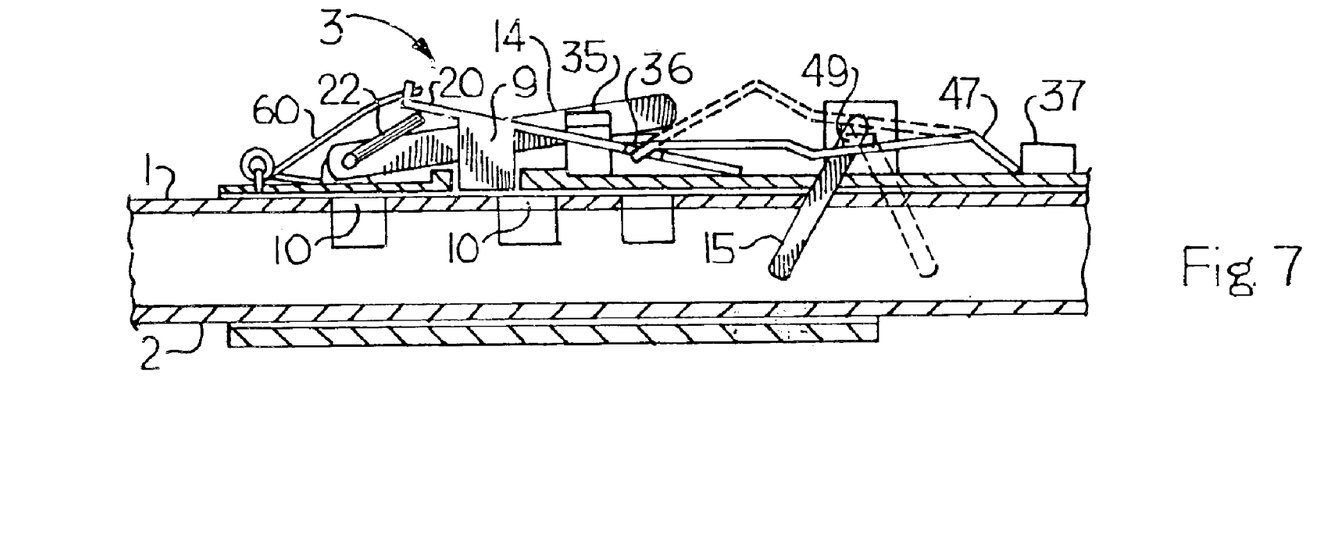
FIG. 7 is a partial vertical section of a locking arrangement having multiple slots for locking the telescopic members in various lengths.

FIG. 7 shows an alternative positioning of a locking and release mechanism 3 of the invention. If the release mechanism 3 is on top, pin 9 and plate 20 can have a lift spring, such as a torsion spring 60 or a leaf spring, to push them into aperture 10 when cam 49 is released. The bias means 47 can be more rigid than the lift spring so that when cam 49 is engaged, pin 9 falls into aperture 10. There is always spring pressure on the locking and release mechanism 3 to move in both directions which allows remote control. In FIG. 7 a torsion spring 60 lifts plate 20 and pulls pin 9 out of aperture 10 when cam 49 is released. The torsion spring 60 is overcome by the force of bias means 47. The pry bar or lever 14 can be lifted, raising projection 22 which lifts pin 9 from aperture 10. The yoke member 35 prevents overextension of the projection 22. Horizontal members 36 and 37 extend over the ends of the bias means 47 to keep it in place. Cam 49 can also be embodied as a solid stop over bias means 47 and spring 62 can be eliminated to form a simple lever operated high leverage latch mechanism.

Figure 8:
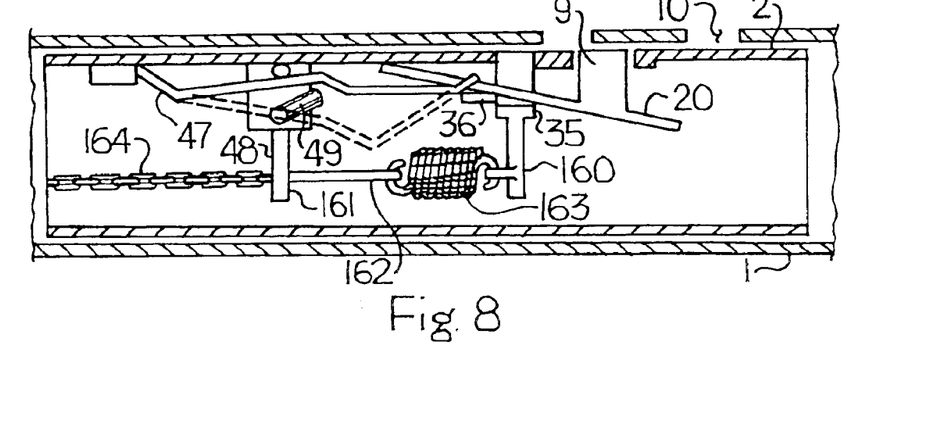
FIG. 8 is a partial sectional view of telescopic members having a remote actuator.

FIG. 8 illustrates a variation of the pin locking mechanism 3 shown in FIG. 4. Latch plate 20 is pivotally mounted on inner telescopic member 2 with pin 9 extending upwardly therefrom. A bias means 47, in the form of a leaf spring, is attached at one end to telescopic member 2 while the opposite end engages latch plate 20 such that pin 9 is biased upwardly toward apertures 10 in outer telescopic member 1. A lever 48 is pivotally mounted on second telescopic member 2 with cam portion 49 engaging the underside of bias means 47. A depending yoke 35 is attached to the inner surface of telescopic member 2 and serves as a stop for the downward movement of latch plate 20. A horizontal member 36 extends from yoke 35 below the end of bias means 47 to keep bias means 47 in place.

In the embodiment shown in FIG. 8, a projection 160 depends from yoke 35 and a projection 161, having a perpendicular extension 162, depends from lever 48. A spring 163 is attached to projection 160 and extension 162 to help bias pin 9 upwardly into one of apertures 10. A remote actuator, such as a chain 164, is attached to projection 161 opposite extension 162. When chain 164 is pulled from, for example, a cab of a vehicle, it removes the contact between cam 49 and bias means 47 allowing pin 9 to drop out of aperture 10. The latch embodiment may be placed internally, as shown in FIG. 8, or may be placed externally on telescopic member 1.

Figure 9:
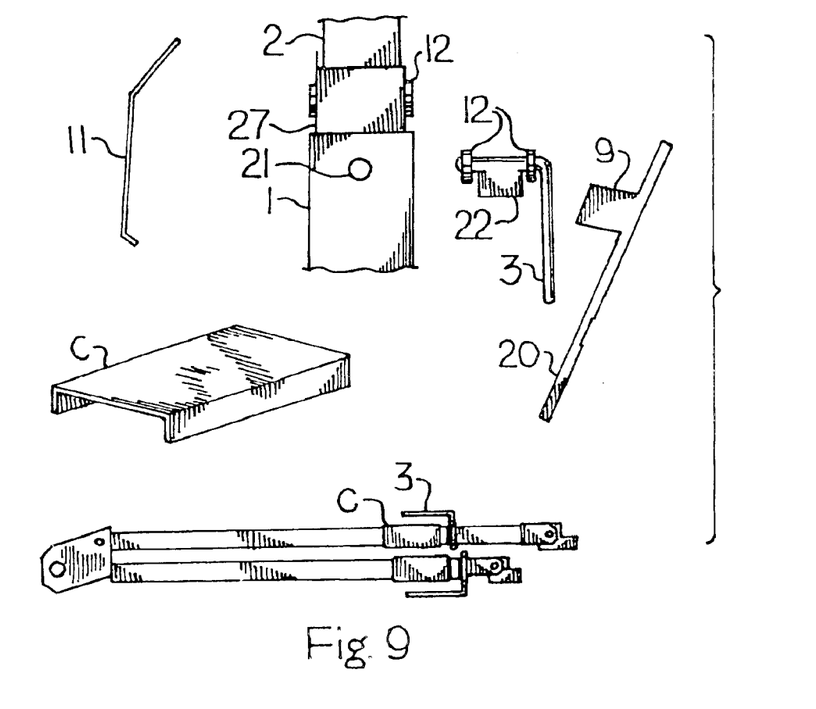
FIG. 9 is an exploded plan view of the components of the tow bar assembly of FIG. 2.
Figure 10:
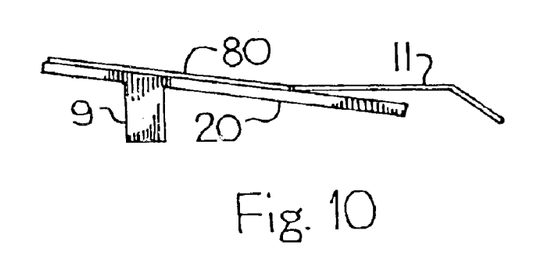
FIG. 10 is a side view of an alternative latch plate of the invention.
Figure 11:
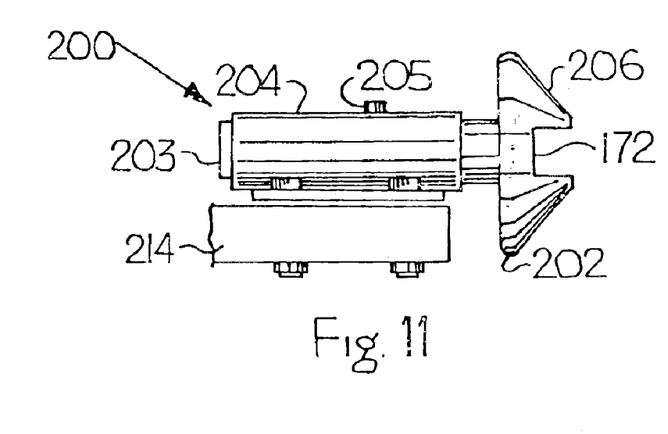
FIG. 11 is a side view of a gate latch of the invention.

FIG. 9 is an exploded view of the components of a latch mechanism of the type shown in FIG. 2. FIG. 10 is an alternative spring mount for the tow bar of FIG. 2. Instead of a hole in plate 20, a reinforcement plate 80 is attached to plate 20. Instead of spring 11 pointed and in a hole in plate 20, plate 80 positions spring 11. This also gives more weld area to mount pin In FIGS. 11 and 12, a gate latch having a blocking mechanism similar to that of FIG. 2 fastens to a gatepost 105 by U iron 100. Pry rod and lever or handle 48 go through a hole 106 in U iron 100. Extending projection or pry plate 22 is welded to pry rod 48. Pry rod 48 also goes through a plate 14, that is welded to the opposite edge side of U iron 100, further holding pry rod 48. Pry rod 48 can also extend through plate 14 and be bent parallel with the part shown and be on the other, opposite side of the handle shown and post 105 so gate 214 can be opened from either side.

Figure 12:
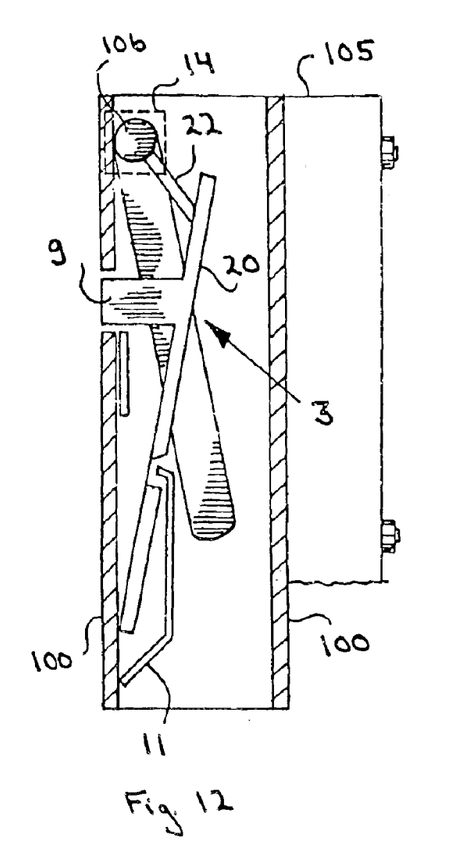
FIG. 12 is a sectional view of the gate latch of FIG. 11 showing a locking and release mechanism of the invention.

In FIG. 12, when gate 214 closes to gatepost 105, gate latch taper 206, mounted on gate 214, moves pin 9 back against the bias of spring 11. When gate latch 206 reaches hole 172, pin 9 penetrates aperture 172, under the bias of spring 11, locking the gate 214. If there is pressure against gate 214 when opening, pry rod 48 is activated which urges plate 22 against pin 9 containing plate 20, which pulls pin 9 out of aperture 172 with approximately a 10:1 mechanical advantage. U iron 100 could also be a square tube with a cover to prevent rust. The gate latch taper 206 can be long to allow for the gate settling downward. Gate latch handle and pry rod 48 can also be bent upward where cattle are unable to move it, and can be operated from horseback.

U iron 100 could also be a square tube. Pin 9 can be extended through plate 20 and through an elongated vertical slot at the side, e.g., right side shown in FIG. 12, of U iron 100 and into post 105 to prevent pin 9 from twisting under force. The latch shown in FIG. 12 can be horizontal to post 105. The latch in FIG. 12 can also be on the gate 214. U iron 100 or square tube 100 can be sized or modified to stop plate 20 from over extension.

Notch 172 and taper 206 can adjust in and out with a lock bolt 205 and notch assembly 200 can be on gatepost 105. Pry plate 22 can be longer for faster action. Mechanical advantage of the latch will and can vary depending on the lengths of the parts.

Spring 11 can have a cover, e.g., as shown in FIG. 3, or a bolt or plate 103 from the right side of U iron 100 and can hold spring 11. Plate 20 can be two pieces as in parts 80 and 20 in FIG. 10. Spring 11 can be two springs and exchanged for a coil spring through pin 9 between plate 20 and the right wall of U iron 100.

While a number of embodiments of the invention are described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A tow bar assembly including at least one elongated frame member, said elongated frame member including a first member and a second member movable with respect to said first member, a locking device for releasably locking said first and second members in an extended position, said locking device including a movable member adapted to extend between and contact said first and second members to maintain said first and second members in a locked relationship, and a high leverage release device mounted on one of said members to move said movable member to permit slidable movement between said first and second members, wherein said movable member is a pin, wherein said pin is connected to a non-resilient latch plate, wherein a spring biases the latch plate, and wherein said release device includes a lever having a projection, said lever pivotally mounted on one of said first or second members, wherein said release device is configured such that pivotal movement of said lever causes said projection to contact said latch plate to move said movable member against the bias of said spring to unlock said first and second members.

2. A tow bar assembly as set forth in claim 1, including a plurality of elongated frame members and a plurality of universal connectors, with one of said universal connectors attached to the distal ends of each of said second members for attaching said tow bar assembly to a towed vehicle.

3. A tow bar assembly as set forth in claim 2, including a connecting member comprising an apex member for attaching said tow bar assembly to a towing vehicle, and a first end of said first member of said first elongated frame member is pivotally connected to said apex member and said first end of said first member of said second frame member is fixed to said apex member.

4. A tow bar assembly as set forth in claim 1, wherein the locking device includes an opening formed in said first member, an opening located on said second member for registration with said opening formed in said first member when said first and second members are in said extended position, said movable member is adapted to extend into said openings in said first and second members to lock said first and second members in said extended position, wherein said second member includes a chamfered surface to guide said movable member into said opening in said second member.

5. A tow bar assembly as set forth in claim 1, wherein said locking device includes at least one opening formed in said second member for alignment with said opening formed in said first member when said first and second members are in said extended position, said movable member adapted to extend into said aligned openings in said first and second members to lock said first and second members in said extended position.

6. A tow bar assembly as set forth in claim 1, including an opening formed in said first member and a plurality of openings formed in said second member for alignment with said opening formed in said first member when said first and second members are in said extended position, said movable member adapted to extend into said aligned openings in said first and second members to lock said first and second members together in said extended position, wherein said release device includes a lever actuation means pivotally mounted on said first member, and wherein said movable member is movable into and out of said aligned openings in said first and second members to lock and release said first and second members relative to each other.

7. A tow bar assembly comprising first and second telescopic members, said second telescopic member connectable to said first telescopic member and slidable within said first telescopic member, said first and second telescopic members including at least one opening, and a locking means for releasably locking said first and second telescopic members in an extended position, said locking means including a movable member adapted to enter said openings and contact said first and second telescopic members to maintain said first and second telescopic members in a locked relationship, and a high leverage release means mounted on one of said telescopic members to move said movable member to permit slidable movement between said first and second telescopic members, wherein said movable member is a pin connected to a non-resilient latch plate, wherein said latch plate is biased by a spring, and wherein said release means includes a lever having a projection, said lever pivotally mounted on one of said first or second members, wherein said release means is configured such that pivotal movement of said lever causes said projection to contact said latch plate to move said movable member against the bias of said spring to unlock said first and second members.

8. A tow bar assembly as set forth in claim 7, wherein said movable member includes a spring to bias said movable member towards said openings and a cover fastened to said first telescopic member to hold said spring.

9. A tow bar assembly as set forth in claim 7, including an apex member for attaching a pair of said first and second telescopic members to a towed unit.

10. A tow bar assembly as set forth in claim 7, wherein a plurality of openings are formed in said second telescopic member for alignment with said opening formed in said first telescopic member when said first and second telescopic members are in said extended position.

11. A tow bar assembly as set forth in claim 7, including stop means connectable with said first telescopic member and extending to said second telescopic member, said stop means contactable with said first telescopic member to prevent separation of said first and second telescopic members as a result of overextending said second telescopic member relative to said first telescopic member.

12. A tow bar assembly comprising first and second telescopic members, said second telescopic member connectable to said first telescopic member and slidable within said first telescopic member, said first and second telescopic members forming an opening, and a locking means for releasably locking said first and second telescopic members in an extended position, said locking means including a movable member, said movable member including an extended and circular element adapted to enter said opening and contact said first and second telescopic members to maintain said first and second telescopic members in a locked relationship, and release means mounted on one of said telescopic members to move said movable member and said counterpart out of contact with said first and second telescopic members to permit slidable movement between said first and second telescopic members, said tow bar assembly further including a plurality of said first and second members, a plurality of universal connectors, with eyebolts configured to be mounted on a towed vehicle completing said universal connector, one of said universal connectors attached to each one of said plurality of said first and second telescopic members for attaching said tow bar assembly to a towed vehicle.

13. A tow bar assembly including first and second frame members, wherein the frame members include a first telescopic member having an open end and a second telescopic member slidable within said open end of said first telescopic member, a locking means for releasably locking said first and second telescopic members in an extended position, said locking means including a movable member adapted to extend between and contact said first and second telescopic members in a locked relationship, and a release means mounted on one of said telescopic members to move said movable member out of contact with said first and second telescopic members to permit slidable movement between said first and second telescopic members, a universal mounting means adapted to be connected to a towed vehicle, said universal mounting means comprising a pair of laterally-spaced coaxial eye bolts adapted to be connected to a towed vehicle, a hollow connecting member located between said spaced eye bolts, a journal pin extending through said spaced eye bolts and said hollow connecting member to permit rotary movement of said hollow connecting member around said journal pin, said hollow connecting member including a journaled extension for connection to said first and second frame members to provide rotary movement of said frame members.

14. A tow bar assembly including at least one elongated frame member, said elongated frame member including a first member and a second member movable with respect to said first member, a locking device for releasably locking said first and second members in an extended position, said locking device including a movable member adapted to extend between and contact said first and second members to maintain said first and second members in a locked relationship, and a release device mounted on one of said members to move said movable member out of contact with said first and second members to permit slidable movement between said first and second members, wherein said movable member is positioned and manipulated by primary and secondary springs to lock and release said members;

said primary spring activated by a cam or a locking lever, so when activated, overrules said secondary spring to move said movable member to lock said first and second members; and when said cam is released on said primary spring, said secondary spring moves said movable member out of said opening releasing said members.

15. A tow bar as claimed in claim 14, wherein said movable member is positioned and manipulated by one spring.

16. A tow bar assembly comprising first and second telescopic members, said second telescopic member connectable to said first telescopic member and slidable within said first telescopic member, said first and second telescopic members forming an opening, and a locking means for releasably locking said first and second telescopic members in an extended position, said locking means including a movable member, said movable member including an extended and circular element adapted to enter said opening and contact said first and second telescopic members to maintain said first and second telescopic members in a locked relationship, and high leverage release means mounted on one of said telescopic members to move said movable member and said counterpart out of contact with said first and second telescopic members to permit slidable movement between said first and second telescopic members, said tow bar assembly further including a lever actuator means including a non-resilient latch plate pivotally mounted on the first member with a pin means depending therefrom, bias means for continually urging the latch plate and pin means toward said opening, said lever actuating means including a pivoting lever member having an upwardly extending projection engaging the underside of the latch plate, the pivot points of the latch plate and the lever member being so disposed relative to each other and projection to permit high leverage release of the pin means from the opening, wherein the lower actuator means provides a mechanical advantage of at least 10:1.

17. A tow bar assembly comprising first and second telescopic members, said second telescopic member connectable to said first telescopic member and slidable within said first telescopic member, said first and second telescopic members forming an opening, and a locking means for releasably locking said first and second telescopic members in an extended position, said locking means including a movable member, said movable member including an extended and circular element adapted to enter said opening and contact said first and second telescopic members to maintain said first and second telescopic members in a locked relationship, and release means mounted on one of said telescopic members to move said movable member and said counterpart out of contact with said first and second telescopic members to permit slidable movement between said first and second telescopic members, said tow bar assembly further including a lever actuator means including a latch plate pivotally mounted on the second member with a pin means extending upwardly therefrom, bias means engaging the latch plate at its underside for maintaining the pin means lever having a cam portion engaging the underside of the biasing means, the cam portion when engaging the biasing means providing a high leverage force of the latch plate, and when disengaged, allowing the latch plate and pin means to gravitationally drop from the apertures.

* * * * *

UNITED STATES PATENT AND TRADEMARK OFFICE
CERTIFICATE OF CORRECTION

PATENT NO. : 6,854,756 B1
DATED : February 15, 2005
INVENTOR(S) : Solberg It is certified that error appears in the above-identified patent and that said Letters Patent is hereby corrected as shown below:

Column 12,
Line 18, "means lever" should read -- means in an upward position toward said apertures, said lever actuating means including a pivoting lever --

Signed and Sealed this

Ninth Day of August, 2005

JON W. DUDAS
*Director of the United States Patent and Trademark Office*